(12) United States Patent
Brzozowski et al.

(10) Patent No.: US 12,425,295 B2
(45) Date of Patent: Sep. 23, 2025

(54) ADVERTISEMENT OF DISCOVERED USER PREMISES NETWORK DEVICES AND SERVICES

(71) Applicant: Comcast Cable Communications, LLC, Philadelphia, PA (US)

(72) Inventors: John Jason Brzozowski, Schwenksville, PA (US); Stephen Allinson, Fairless Hills, PA (US); Richard Vetter, Landsdowne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/994,465

(22) Filed: Nov. 28, 2022

(65) Prior Publication Data
US 2023/0239363 A1    Jul. 27, 2023

Related U.S. Application Data

(63) Continuation of application No. 15/296,550, filed on Oct. 18, 2016, now Pat. No. 11,528,332.

(51) Int. Cl.
| | |
|---|---|
| *H04L 41/0806* | (2022.01) |
| *H04L 9/40* | (2022.01) |
| *H04L 41/12* | (2022.01) |
| *H04L 67/00* | (2022.01) |
| *H04L 67/10* | (2022.01) |
| *H04L 67/51* | (2022.01) |

(52) U.S. Cl.
CPC ......... *H04L 41/0806* (2013.01); *H04L 41/12* (2013.01); *H04L 63/0428* (2013.01); *H04L 67/10* (2013.01); *H04L 67/34* (2013.01); *H04L 67/51* (2022.05); *H04L 63/0823* (2013.01)

(58) Field of Classification Search
CPC ..... H04L 67/16; H04L 41/0806; H04L 41/12; H04L 63/0428; H04L 67/10; H04L 67/34; H04L 63/0823
See application file for complete search history.

(56) References Cited

U.S. PATENT DOCUMENTS

| | | | |
|---|---|---|---|
| 7,603,494 B2 | 10/2009 | Klein et al. | |
| 10,015,044 B1 | 7/2018 | Budin et al. | |
| 2008/0152165 A1 | 6/2008 | Zacchi et al. | |
| 2009/0125971 A1 | 5/2009 | Belz et al. | |
| 2010/0162335 A1* | 6/2010 | Davis ................. | H04N 7/17318 725/110 |
| 2010/0280904 A1 | 11/2010 | Ahuja | |
| 2012/0066722 A1 | 3/2012 | Cheung et al. | |
| 2012/0149309 A1 | 6/2012 | Hubner et al. | |
| 2013/0129232 A1 | 5/2013 | Cok et al. | |

(Continued)

*Primary Examiner* — Joe Chacko
(74) *Attorney, Agent, or Firm* — Banner & Witcoff, Ltd.

(57) ABSTRACT

Systems and methods for a device portal management system that stores discovery data for multiple computing devices are described. The device portal management system may store first discovery data for a first computing device and second discovery data from a second computing device. A user associated with the first computing device and the second computing device may access the discovery data via the device portal management system. The user may further configure the first computing device and the second computing device via the device portal management system.

24 Claims, 9 Drawing Sheets

(56) References Cited

U.S. PATENT DOCUMENTS

| | | | |
|---|---|---|---|
| 2014/0189762 A1* | 7/2014 | Hainline | H04N 21/23113 |
| | | | 725/93 |
| 2015/0281349 A1* | 10/2015 | Das | H04L 67/104 |
| | | | 709/217 |
| 2015/0304388 A1* | 10/2015 | Procopio | H04L 67/561 |
| | | | 709/204 |
| 2016/0134737 A1 | 5/2016 | Pulletikurty | |
| 2017/0078454 A1 | 3/2017 | Berookhim et al. | |
| 2017/0331869 A1* | 11/2017 | Bendahan | H04L 65/612 |

* cited by examiner

ADVERTISEMENT OF DISCOVERED USER PREMISES NETWORK DEVICES AND SERVICES

CROSS-REFERENCE TO RELATED APPLICATIONS

This application is a continuation of and claims priority to U.S. patent application Ser. No. 15/296,550 filed Oct. 18, 2016, which is hereby incorporated by reference in its entirety.

BACKGROUND

Users within a household may utilize various mobile and stationary computing devices. In many instances, these computing devices may each run on different operating systems. Thus, it may be difficult to for the users to perform services, such as sharing content amongst these devices.

SUMMARY

This summary is not intended to identify critical or essential features of the disclosures herein, but instead merely summarizes certain features and variations thereof. Other details and features will also be described in the sections that follow.

A first computing device may discover, using a first device discovery protocol, a second computing device. The first computing device may send, to a server, first discovery data associated with the second computing device. The first computing device may discover, using a second device discovery protocol, a third computing device. The first computing device may send, to the server, second discovery data associated with the third computing device. The first computing device may receive, from the server first configuration settings associated with the second computing device. The first computing device may transmit, to the second computing device, the first configuration settings.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
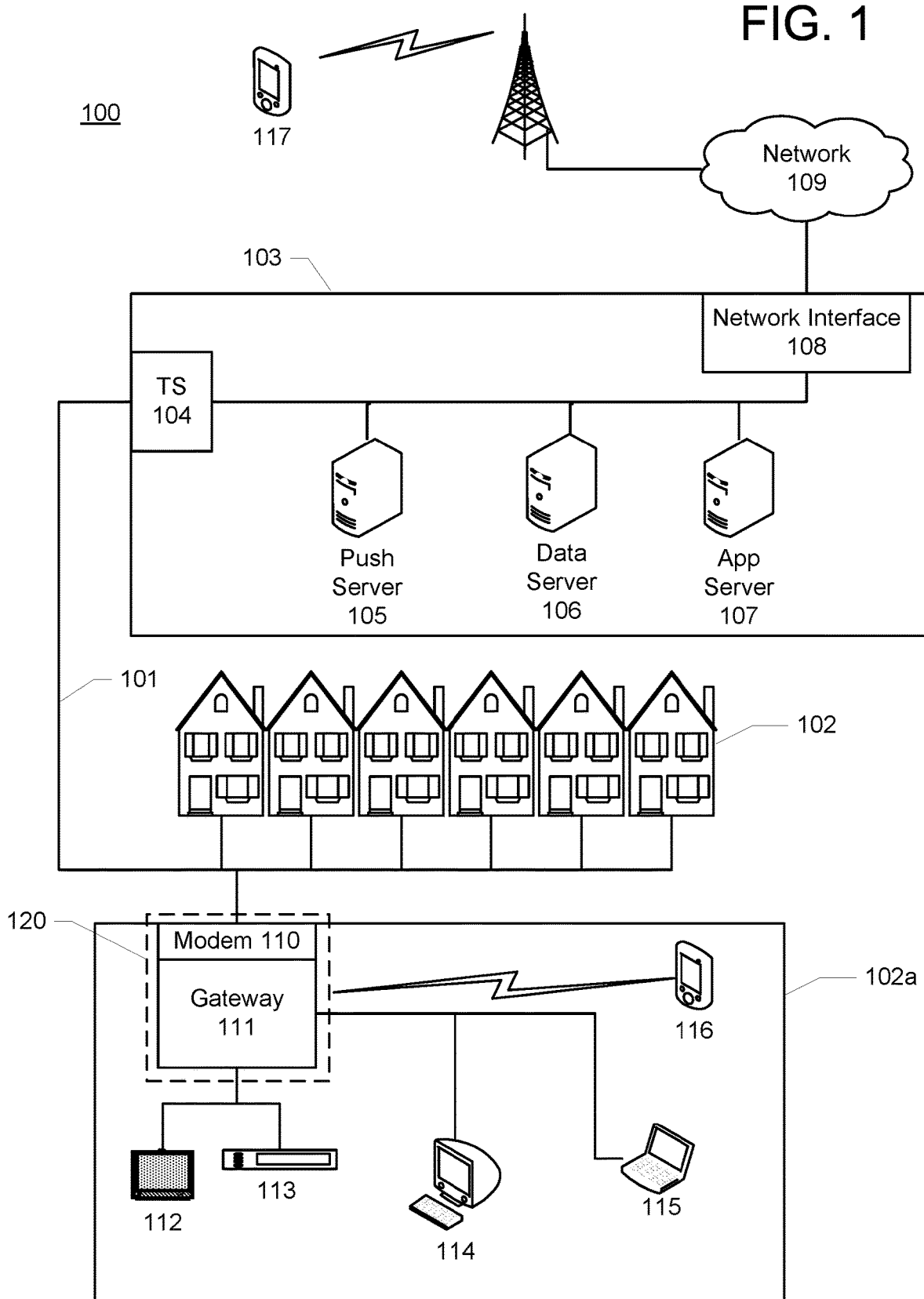
FIG. 1 shows an example information access and distribution network.

FIG. 1 shows an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as locations 102 (e.g., homes, businesses, institutions, etc.), to a local office 103 (e.g., a central office or headend). The local office 103 may transmit downstream information signals onto the links 101, and each location 102 may have a receiver used to receive and process those signals.

There may be one link 101 originating from the local office 103, and it may be split a number of times to distribute the signal to various locations 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems at the various locations 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include a push notification server 105. The push notification server 105 may generate push notifications to deliver data and/or commands to the various locations 102 in the network (or more specifically, to the devices in the locations 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, initiate delivery (e.g., streaming) of the data to the requesting user and/or device, and may store data related to one or more computing devices.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the locations 102.

An example location 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway 111 (e.g., a gateway interface device). The gateway 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), tablets, smartwatches, etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
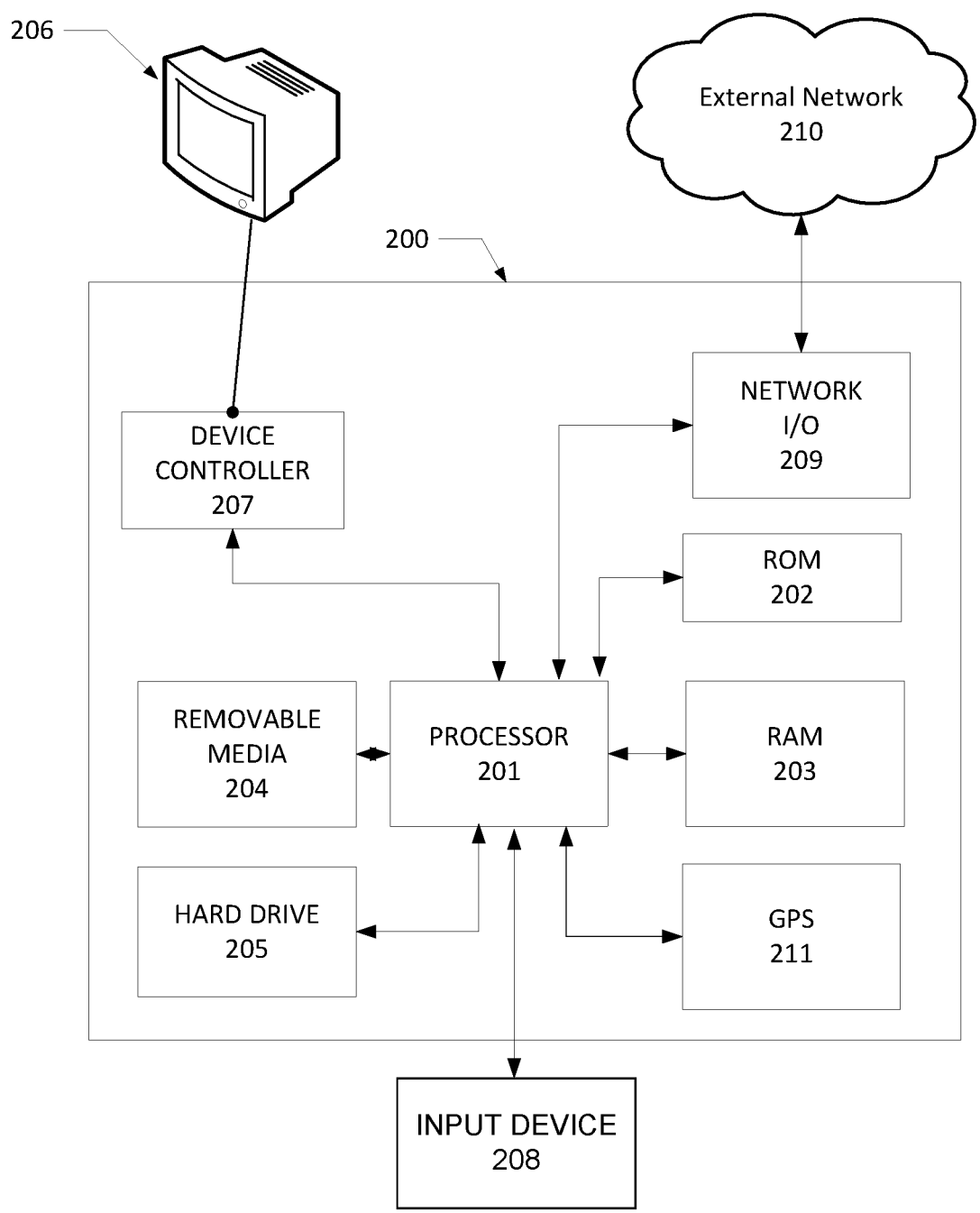
FIG. 2 shows an example hardware and software platform on which various elements described herein can be implemented.

FIG. 2 shows general hardware and software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Figure 3:
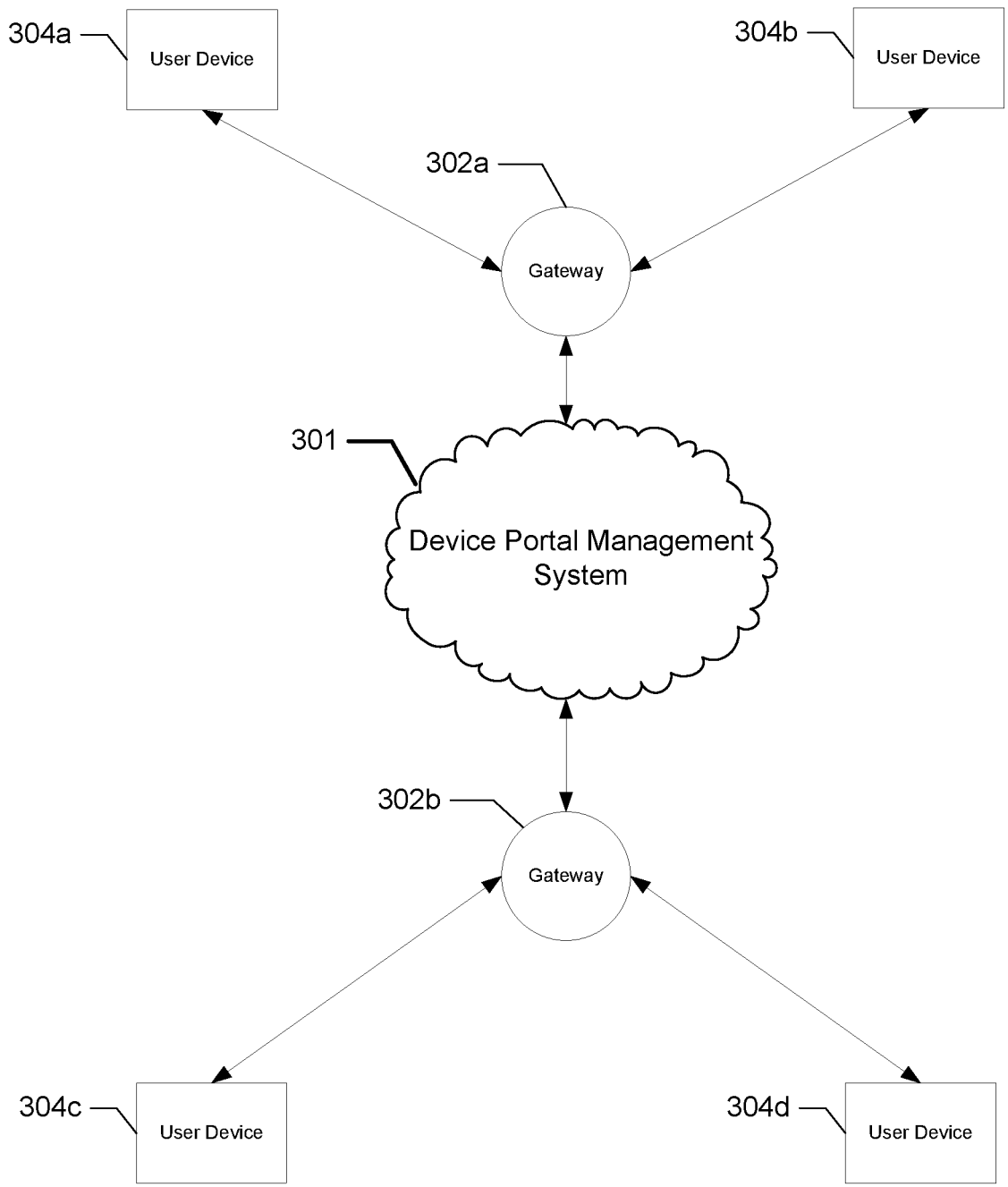
FIG. 3 shows an example layout of exemplary components according to one or more illustrative aspects of the disclosure.

FIG. 3 shows an example layout of exemplary components according to one or more illustrative aspects of the disclosure. As shown in FIG. 3, a device portal management system 301 may communicate with one or more gateways, such as a gateway device 302a and a gateway device 302b. The device portal management system 301 may be any computing device, such as that shown in FIG. 2, that is configured to perform the steps described herein. The gateway device 302a may be located at a first premises (e.g., a home or other user environment) and the gateway device 302b may be located at a second premises. User devices 304a-304d may be include one or more of televisions, set top boxes (STBs), personal computers, laptop computers, wireless devices such as wireless laptops and netbooks, mobile phones, mobile televisions, personal digital assistants (PDA), tablets, smartwatches, etc.), and any other desired devices.

The gateway devices 302a and 302b may include (not shown) local network interfaces to provide communication signals to user devices in the home. For example, the gateway device 302a may include a local network interface to provide communication signals to the user device 304a and the user device 304b, and the gateway device 302b may include a local network interface to provide communication signals to the user device 304c and the user device 304d. The gateway devices 302a and 302b may similarly receive communication signals from the user devices 304a-b and the user devices 304c-d, respectively. Bidirectional communication between the gateway devices 302a and 302b and the user devices 304a-d may be used to exchange various types of data. For example, data related to device, service, and/or application discovery may be exchanged via bidirectional communication between the gateway devices 302a and 302b and the user devices 304a-d. Alternatively, or additionally, data related to device configuration may be exchanged via bidirectional communication between the gateway devices 302a and 302b and the user devices 304a-d. The gateway device 302a and the gateway device 302b may be accessed by the user devices 304a-d via local IP addresses assigned to the gateway devices. Additionally, or alternatively, the gateway device 302a and the gateway device 302b may be accessed remotely via Internet IP addresses assigned to the gateway device 302a and the gateway device 302b. The gateway device 302a and the gateway device 302b may further be configured to be accessible (locally or remotely) via a username and password. A username and password for the gateway device 302a may be selected by a user associated with the first premises. A username and password for the gateway device 302b may be selected by a user associated with the second premises. Additionally, or alternatively, a user at the first premises may access services or data from user devices 304c and 304d via gateway 302b. Similarly, a user at the second premises may access services or data from the user devices 304a and 304b via the gateway device 302a.

A user at the first premises may further access one or more computing devices (not shown) on a first cloud network via the gateway device 302a. The user at the first premises may access the one or more computing devices on the first cloud network via the gateway device 302a for the purpose of storing data or retrieving data. A user at the second premises may further access one or more computing devices on a second cloud network via the gateway device 302b. The user at the second premises may access the one or more computing devices on the second cloud network via the gateway device 302b for the purpose of storing data or retrieving data. The first cloud network may be the same as or different than the second cloud network. The one or more computing devices, the first cloud network and/or the second cloud network may be maintained by an enterprise.

Figure 4:
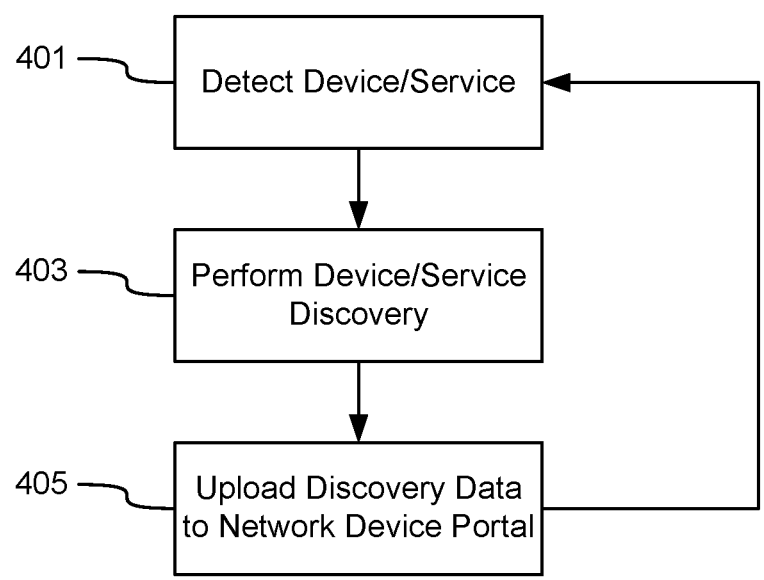
FIG. 4 shows an example method for performing data discovery between a gateway and a user device according to one or more illustrative aspects of the disclosure.

FIG. 4 shows an example method of performing device or service discovery according to one or more exemplary aspects of the disclosure. Discovery of user devices and/or services on the user devices may be performed by a gateway device, such as the gateway device 302a and/or the gateway device 302b. User devices may include the user devices 304a-d shown in FIG. 3. For example, the user devices 304a-d may be televisions, STBs, personal computers, laptop computers, wireless devices (wireless laptops and netbooks, mobile phones, mobile televisions, personal digital assistants (PDA), tablets, smartwatches, etc.), and any other desired devices.

As discussed above in reference to FIG. 2, the gateway devices 302a and 302b may include local network interfaces to provide communication signals to user devices in the home. Similarly, the user devices 304a-d in the home may also include local network interfaces to provide communication signals to the gateway devices 302a and 302b, and/or to other user devices. The user devices 304a-d and the gateway devices 302a and 302b may each be connected to a network via its respective local network interface. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

The gateway device 302a may use one or more protocols to perform device discovery, service discovery and/or service discovery. For example, the gateway device 302a may use DNS-based service discovery (DNS-SD), Simple Service Discovery Protocol (SSDP), Link Layer Discovery Protocol (LLDP), Bluetooth Service Discovery Protocol, Dynamic Host Configuration Protocol (DHCP), Service Announcement Protocol (SAP), port scanning, traffic snooping, WS-Discovery (Web Services Dynamic Discovery), Universal Plug and Play (UPnP), and/or Bonjour. In one example, the gateway device 302a may use a first discovery protocol to discover a first the user device 304a (or to discover services and applications offered by the user device 304a), and a second discovery protocol to discover a second the user device 304b (or to discover services and applications offered by the user device 304b). The first discovery may be the same as the second discovery protocol or may be different than the second discovery protocol. For example, a first the user device 304a may operate on a first operating system, such as APPLE IOS, and a second the user device 304b may operate on second operating system, such as MICROSOFT Windows. Accordingly, the gateway device 302a may perform device or service discovery of the user device 304a using the Bonjour discovery protocol, and may perform device or service discovery of the user device 304b using the UPnP discovery protocol.

The gateway device 302a may, at step 401, detect a user device 304a or a service provided by the user device 304a. The gateway device 302a may detect a new user device, a new service being offered by a new user device, and/or a new service being offered by a previously detected user device. The gateway device 302a may perform passive device discovery or active device discovery. In the case of the passive device discovery, the gateway device 302a may listen for "alive" messages broadcast by one or more user devices. In response to receiving an "alive" message broadcast by a user device, such as the user device 304a, the gateway device 302a may request additional information from the user device 304a. The user devices 304a-d may receive the request for additional information from the gateway device 302a. The user device 304a may then identify itself to the gateway device 302a by transmitting preliminary configuration information to the gateway device 302a.

In the case of active device discovery, the gateway device 302a may actively search for one or more user devices by broadcasting messages. That is, the gateway device 302a may intermittently broadcast a "discover" message in a first discovery protocol and simultaneously broadcast a "discover" message in a second discovery protocol. Alternatively, or additionally, the gateway device 302a may broadcast a "discover" message in a first discovery protocol, and then subsequently broadcast a "discover" message in a second discovery protocol. A greater number of discovery protocol types may be supported. In response to receiving a "discover" message broadcast by the gateway device 302a, the user device 304a may identify itself to the gateway device 302a by transmitting preliminary configuration information to the gateway device 302a.

If the user device 304a has identified itself to the gateway device 302a, the gateway device 302a may, at step 403, perform additional device or service discovery. That is, the gateway device 302a may request additional data from the user device 304a detected in step 401. For example, the device and/or service discovery data requested by the gateway device 302a may include a description of the user device 304a, a list of services provided by the user device 304a, a list of commands that may be used to invoke the services provided by user devices 304a, or any other desired information. The user device 304a may respond to the request from the gateway device 302a by transmitting a description of the user device 304a, a list of services provided by the user device 304a, a list of commands that may be used to invoke the services provided by the user device 304a, and any other requested information to the gateway device 302a. Alternatively, or additionally, the user device 304a may transmit a pointer to this information to the gateway device 302a, and the gateway device 302a may use the pointer to access the requested data. The information that is exchanged between the gateway device 302a and the detected the user device 304a may vary based on the specific discovery protocol that is used.

At step 405, the gateway device 302a may upload the discovery data received from the user device 304a at step 403 to the device portal management system 301. The gateway device 302a may upload the discovery data in the same format as received from the user device 304a, or may convert the discovery device to a standard or predetermined format prior to uploading. In a first instance, the gateway device 302a may only have performed device or service discovery for one user device in step 403, such as the user device 304a. In this instance, the gateway device 302a may aggregate all discovered data from the user device 304a. As noted above, the gateway device 302a may detect a new user device, a new service being offered by a new user device, and/or a new service being offered by a previously detected user device. If the user device 304a is a new user device that has not been previously detected by the gateway device 302a, the gateway device 302a may assign a device ID to the user device 304a. The gateway device 302a may store the device ID assigned to the user device 304a in a local device ID table maintained at the gateway device 302a. The local device table may also store, for each device that has been discovered by that gateway device, a pointer to a device module associated with that device. The device module for each user device may store user-configured rules that are transmitted from the device portal management system 301 (discussed below in reference to FIG. 6). If the user device 304a is not a new user device (i.e. the gateway device 302a had previously detected the user device 304a, and at step 401, had only detected a new service being offered by already-detected the user device 304a), the gateway device 302a may retrieve the device ID for the user device 304a from the local device ID table stored at the gateway device 302a.

If the gateway device 302a has assigned a device ID to the user device 304a or retrieved the device ID for the user device 304a, the gateway device 302a may tag the aggregated discovery data with the device ID and with an identification of the gateway device 302a. The gateway device 302a may then upload the tagged data to the device portal management system 301. In one scenario, the gateway device 302a may authenticate itself to the device portal management system 301 using a username and password prior to uploading the tagged discovery data to the device portal management system 301. The username and password used by the gateway device 302a may have been previously configured by the user associated with the gateway device 302a via the device portal management system 301. If the gateway device 302a has authenticated itself to the device portal management system 301, the gateway device 302a may establish a connection, such as a long poll connection, over HTTPS to the device portal management system 301, and upload the tagged discovery data via the long poll connection.

Alternatively, or additionally, the gateway device 302a may have performed device or service discovery for multiple user devices in step 403, such as the user device 304a and the user device 304b. For example, the gateway device 302a may have detected new the user device 304a, and may have further detected a new service on previously-detected the user device 304b. In this instance, the gateway device 302a may aggregate the discovered data for each user device. The gateway device 302a may assign a device ID to the user device 304a (a new user device) and store the assigned device ID in the local device ID table maintained at the gateway device 302a. The gateway device 302a may tag the discovery data from the user device 304a with the assigned device ID and with an identification of the gateway device 302a. The gateway device 302a may then retrieve the device ID for the user device 304b (a previously discovered user device) from the local device ID table. The gateway device 302a may tag the discovery data from the user device 304b with the retrieved device ID for the user device 304b and with an identification of the gateway device 302a. The gateway device 302a may then upload the tagged discovery data from each of the user device 304a and the user device 304b to the device portal management system 301. Processing may then return to step 401, where the gateway device 302a may detect another user device and/or another service provided by a user device.

Figure 5:
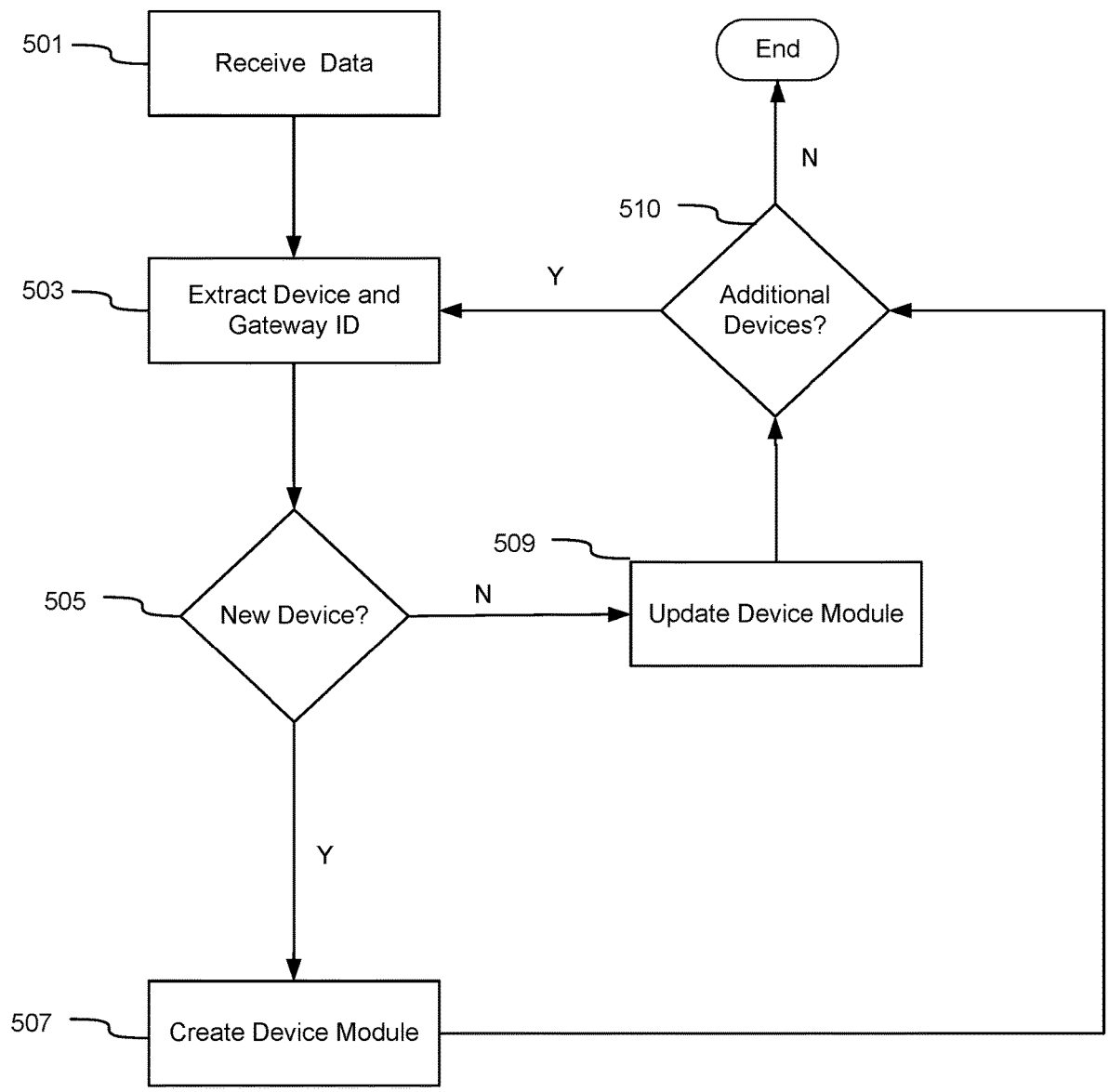
FIG. 5 shows an example method for creating or updating a device module associated with a user device by a device portal management system according to one or more illustrative aspects of the disclosure.

FIG. 5 shows an example method of processing device or service discovery data by the device portal management system 301 according to one or more exemplary aspects of the disclosure. At step 501, the device portal management system 301 may receive device and/or service discovery data from a gateway device, such as the gateway device 302a or the gateway device 302b. The device portal management system 301 allows for centralized authentication and remote management of user devices that are located at a premises associated with a user. The device portal management system 301 further provides a user access to and visibility of all the user devices (and the services offered by the user devices) at the premises associated with the user. As discussed in reference to FIG. 4, the discovery data transmitted from a gateway device to the device portal management system 301 is tagged with a device ID and with an identification of the gateway device that is transmitting the discovery data. At step 503, the device portal management system 301 may extract a first device ID and a first gateway device identification from the discovery data received at step 501.

At step 505, the device portal management system 301 may determine if the extracted first device ID represents a new device or an already discovered device. As discussed above in reference to FIG. 4, a gateway device, such as the gateway device 302a, may maintain a local device table at the gateway device. The local device table may store a list of device IDs for devices that have been discovered by the gateway device, as well as a device module for each discovered user device. The device portal management system 301 may maintain such a table for each gateway device. That is, the device portal management system 301 may maintain a first local table associated with a first gateway device, such as the gateway device 302a. The first local table may store a list of device IDs for each device that the device portal management system 301 has received discovery data for from the gateway device 302a. The first local table may additionally store, for each device in the first table, a pointer to a device module associated with that device. Similarly, the device portal management system 301 may maintain a second local table associated with a second gateway device, such as the gateway device 302b. The second local table may store a list of device IDs for each device that the device portal management system 301 has received discovery data for from the gateway device 302b. The second local table may additionally store, for each device in the second table, a pointer to a device module associated with that device. A greater or fewer number of tables may be maintained by the device portal management system 301, based on the number of gateway devices that have transmitted discovery data to the device portal management system 301. Alternatively, or additionally, the device portal management system 301 may maintain a single table that stores all of the device IDs for all discovery data received by the device portal management system 301. Such a table may be indexed by the gateway devices that transmitted the discovery data. At step 505, the device portal management system 301 may first locate a local table that is associated with the first gateway device identification extracted at step 503. The device portal management system 301 may then search the local table using the first device ID extracted at step 503 to determine if the first device or service corresponds to a new device or to an already discovered device.

If, at step 505, the device portal management system 301 determines that the first device corresponds to a new device, the device portal management system 301 may, at step 507, create a first device module for the first device (discussed in detail below in reference to FIG. 7). The device portal management system 301 may store the discovery data received for the first device in step 501 in the first device module. The device portal management system 301 may update the local table that is associated with the gateway device identification extracted at step 503 with the device ID extracted for the first device at step 503. The device portal management system 301 may also store a pointer for the first device module in the local table that is associated with the gateway device identification extracted at step 503.

If at step 505, the device portal management system 301 determines that the device portal management system 301 has previously received discovery device for the first device from the gateway identified by the extracted gateway device identification, the device portal management system 301 may, at step 509, update a device module that is associated with the first device. Using the extracted gateway device identification, the device portal management system 301 may first locate a local table that is associated with the gateway device identified by the extracted gateway device identification. Using the extracted device ID of the first device, the device portal management system 301 may then locate a pointer to the device module associated with the first device within the local table. The device portal management system 301 may then update the device module with the discovery data received at step 501. For example, if the discovery data received for the first device includes a new service provided by the first device, the device portal management system 301 may update the device module for the first device to include the new service.

At step 510, the device portal management system 301 may determine if the discovery data received at step 501 includes discovery data for another device (i.e. other than the first discovery device). If the device portal management system 301 determines that the discovery data received at step 501 includes discovery data for another device, processing may return to step 503. If the discovery data received at step 501 does not include discovery data for another device, processing may end.

Figure 6:
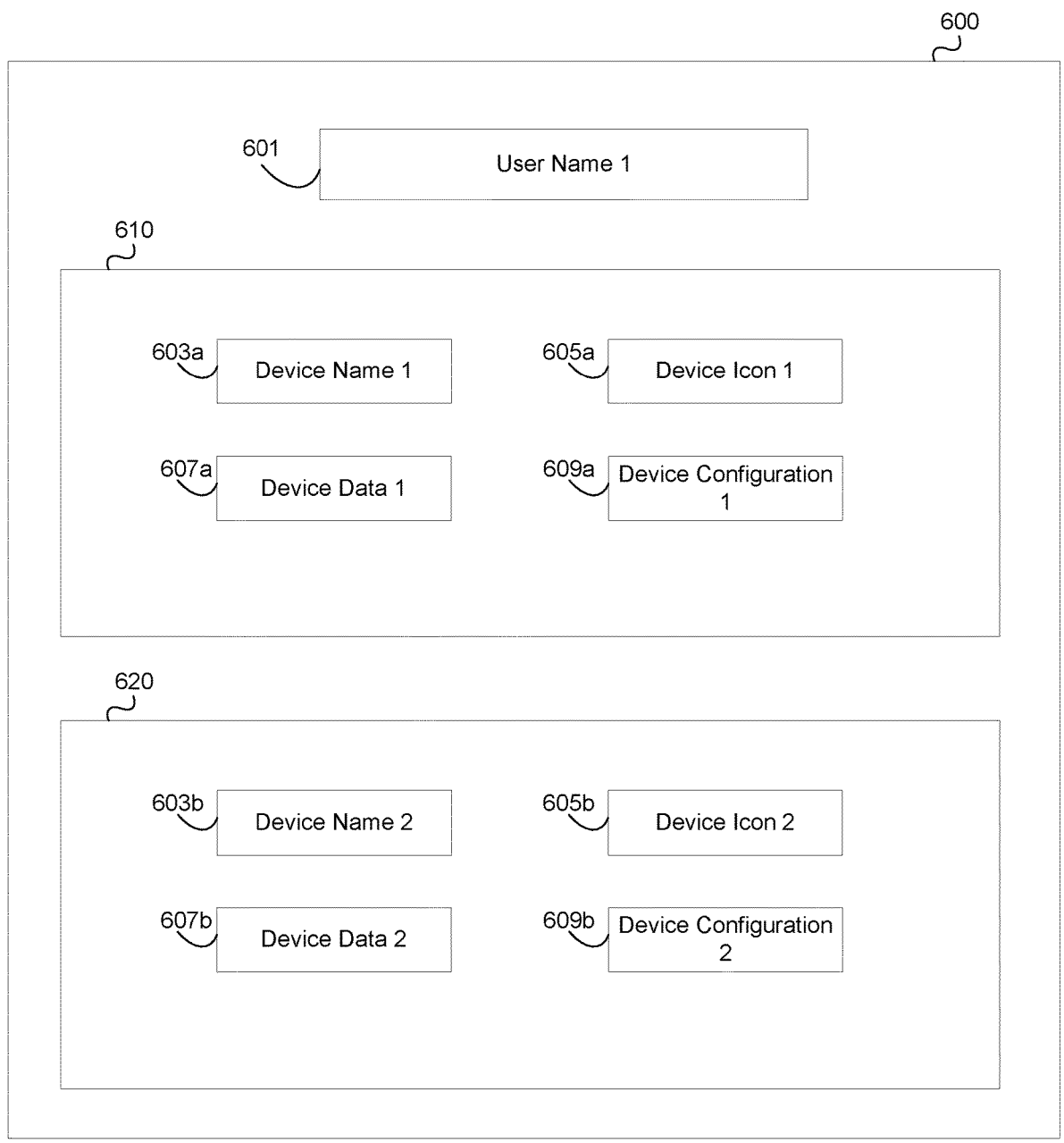
FIG. 6 shows a user interface that may be presented to a user of a device portal management system according to one or more illustrative aspects of the disclosure.

FIG. 6 shows a user interface that may be presented by the device portal management system 301 to a user of the device portal management system 301. The device portal management system 301 may be maintained by an organization or enterprise that offers various products and services that are associated with the premises its users. For example, the enterprise may offer products or services to a user via a gateway device at the premises associated with the user. As noted above in reference to FIG. 5, the device portal management system 301 may maintain a local table for each gateway device that has transmitted discovery data to the device portal management system 301. As further noted above in reference to FIG. 5, a first local table maintained by the device portal management system 301 for a first gateway device may include a list of the user devices for which discovery data has been received from the gateway device, and a pointer to a device module for each of the user devices listed therein.

A user may log onto the device portal management system 301 using a username and password. The user interface 600 may be presented to the user who has logged on. The data field 601 may display the name of the user. The data field 601 may display additional information related to the user, such as information regarding the user's account with the enterprise, or any other desired information. The user interface 600 may further include a display of the device modules 610 and 620. The device module 610 may be associated with a first user device at the premises of the user, such as the user device 304*a*, that may have been discovered a gateway device associated with the user and the enterprise, such as the gateway device 302*a*. Subsequent to discovering the user device 304*a*, the gateway device 302*a* may have transmitted the discovery data of the user device 304*a* to the device portal management system 301. The device module 620 may be associated with a second user device at the premises of the user, such as the user device 304*b*, that may have been discovered by the gateway device 302*a*. Subsequent to discovering the user device 304*b*, the gateway device 302*a* may have transmitted the discovery data of the user device 304*b* to the device portal management system 301. Each of the user device 304*a* and the user device 304*b* may have further transmitted information about the respective user device to the gateway device 302*a*. The gateway device 302*a* may have transmitted this information to the device portal management system 301. The device portal management system 301 may have stored the information related to the user devices within the device modules maintained by the device portal management system 301 for each user device. The depiction of two the device modules 610 and 620 is merely for exemplary purposes, and a greater or fewer number of device modules may be displayed. A device module for each user device for which discovery data has been received from the gateway device associated with the premises of the user may be displayed within the user interface.

The device modules 610 and 620 may include data fields 603*a* and 603*b*, respectively. The data field 603*a* may display the name of the user device 304*a*. The data field 603*b* may display the name of the user device 304*b*. The displayed name may be the device ID transmitted from the gateway device 302*a* to the device portal management system 301. Alternatively, or additionally, the displayed name may be configured by the user. The device modules 610 and 620 may further include device icons 605*a* and 605*b*. These may be icons that represent the manufacturer of the user device. For example, the user device 304*a* may be manufactured by APPLE, while the user device 304*b* may be manufactured by SAMSUNG. In this example, device icon 605*a* may include the APPLE icon, and device icon 605*b* may include the SAMSUNG icon. Alternatively, or additionally, the user may select the icon to be displayed.

The device modules 610 and 620 may include the data fields 607*a* and 607*b*, respectively. The data fields 607*a* and 607*b* may include device data for each user device. For example, the data fields 607*a* and 607*b* may include the discovery data received by the device portal management system 301 for the user device 304*a* and the user device 304*b*, respectively. The data fields 607*a* and 607*b* may include information on the make and model of the user devices, the operating system executing on the user devices, the IP address of the user device, or any other desired information. The data fields 607*a* and 607*b* may further include links to the data, applications, and services currently being offered or shared by that device. For example, the user device 304*a* may be a hard drive. The data field 607*a* may include a link to the contents of the hard drive. If the user clicks on the link, a list of content that is currently stored on the hard drive (i.e. a list of content currently stored on the user device 304a) may be displayed for the user. In another example, the user device 304a may offer photo sharing, music sharing, and/or file sharing services. Each of these services may be listed in the data fields 607a and 607b.

The data fields 609a and 609b may include one or more rules that have been configured by the user for the user device 304a and the user device 304b, respectively. The data fields 609a and 609b may be linked to the data fields 607a and 607b, respectively. That is, the end-result of the rules configured by the user via the data fields 609a and 609b may be displayed in the data fields 607a and 607b. The user may configure the security settings of the user device 304a via the data field 609a. For example, the user may configure first encryption settings for first data on the user device 304a and second encryption settings for second user data on the user device 304a. Alternatively, or additionally, the user may configure, via data field 309a, the user device 304a to track the usage of first data on the user device 304a, or to track usage of all data on the user device 304a. The security settings configured by the user in the data field 609a may be reflected in data field 607a. Alternatively, or additionally, the user may configure the firewall settings of the user device 304a via the data field 609a. The user may further use the data field 609a to create a vanity domain for the user device 304a. The resulting vanity domain may be displayed in data field 607a.

The user may further configure sharing settings of one or more user devices via the data fields 609a and 609b. For example, the user device 304a may be a laptop device that has an enterprise application installed on it. The user may have configured, via the data field 609a, the user device 304a such that the enterprise application shares a first file with the user device 304b. The data field 607a of the user device 304a may indicate that the enterprise application is currently sharing the first file with the user device 304b. The data field 607b of the user device 304b may indicate that the user device 304b has been granted access to the first file on the user device 304a.

The user may further configure cloud-related settings for the user device 304a and the user device 304b via the data fields 609a and 609b. That is, the user may input information identifying one or more computing devices on one or more cloud networks that may be accessed by the user device 304a and the user device 304b. For example, the user may indicate, via the data field 609a, that the user device 304a may communicate with a first computing device on a first cloud network. The user may further indicate, via the data field 609b, that the user device 304b may communicate with a second computing device on a second cloud network. The first computing device may be the same as or different than the first computing device. The first cloud network may be the same as or different than the second cloud network. Communication between the user device 304a and the first computing device may be bi-directional, as the user device 304a may transmit data to and receive data from the first computing device via the gateway device 302a and the first cloud network. Similarly, communication between the user device 304b and the second computing device may be bi-directional, as the user device 304b may transmit data to and receive data from the second computing device via the gateway device 302b and the second cloud network. The user may further input authorization information that is to be provided by one or more of the user device 304a, the user device 304b, the first computing device, and the second computing device prior to the exchange of any data stored on these devices. The user may further configure encryption settings to be used if transferring data between the user device 304a and the first computing device, and if transferring data between the user device 304b and the second computing device. The encryption settings may vary based on the device transmitting the data, the type of data being transmitted, etc.

The user may further utilize the data fields 609a and 609b to configure automatic activities for the user device 304a and the user device 304b, respectively. For example, the user device 304a may be a laptop device and the user device 304b may be a hard-drive. The user may wish to have all data from the user device 304a automatically backed-up to the user device 304b on a regular basis, such as daily, weekly, bi-weekly, monthly, etc. The user may configure the user device 304a, via the data field 609a, to transmit back-up data to the user device 304b if prompted to do so or on a select time interval. The user may configure, via the data field 609b, the user device 304b to store received back-up data in select locations. The data field 607a may display data indicative of the most current back-up date (i.e. the latest date on which data was transmitted to the user device 304b). The data field 607b may similarly display the latest data on which data was received from the user device 304a. The user may configure the rule (via the data field 609a) such that the first the user device 304a automatically transmits the back-up data on a customized time interval selected by the user. Alternatively, or additionally, a device module for the gateway device 302a (not shown) may be displayed within the user interface 600. The user may configure the gateway device 302a, via the device module for the gateway device 302a, to initiate the backup from the user device 304a to the user device 304b on a time interval selected by the user. The user's configuration, if completed, may be transmitted from the device portal management system 301 to the gateway device 302a. The gateway device 302a may then automatically prompt the user device 304a to transmit data to the user device 304b on the time interval selected by the user. The gateway device 302a may also prompt the user device 304b to receive and store the data transmitted from the user device 304a.

Similarly, the user may further utilize the data fields 609a and 609b to configure automatic cloud-related activities for the user device 304a and the user device 304b, respectively. As noted above, the user device 304a may communicate with a first computing device on a first cloud network and the user device 304b may communicate with a second computing device on a second cloud network. The user may utilize the data fields 609a and 609b to configure an automated back-up system between the user device 304a and the first computing device, and the user device 304b and the second computing device. For example, the user device 304a may be a laptop device and the first computing device may be a server. The user may wish to have all data from the user device 304a automatically backed-up to the first computing device on the first cloud network on a regular basis, such as daily, weekly, bi-weekly, monthly, etc. The user may configure the user device 304a, via the data field 609a, to transmit back-up data to the first computing device on the first cloud network if prompted to do so or on a select time interval. The data field 607a may display data indicative of the most current back-up date (i.e. the latest date on which data was transmitted to the first computing device). The user may configure the rule (via the data field 609a) such that the first the user device 304a automatically transmits the back-up data on a customized time interval selected by the user.

Alternatively, or additionally, a device module for the gateway device 302a (not shown) may be displayed within the user interface 600. The user may configure the gateway device 302a, via the device module for the gateway device 302a, to initiate the backup from the user device 304a to the first computing device on the first cloud network on a time interval selected by the user. The user's configuration, if completed, may be transmitted from the device portal management system 301 to the gateway device 302a and the user device 304a. The gateway device 302a may then automatically prompt the user device 304a to transmit data to the first computing device on the time interval selected by the user. The user may further specify encryption rules to be applied to the data by the user device 304a prior to transmittal to the first computing device on the first cloud network.

As noted above, the user interface 600 may further include a gateway module (not shown). The gateway module may be used to configure one or more rules for the gateway device 302a. For example, the user may configure firewall settings for the gateway device 302a via the gateway module. The user may further configure security settings to be used by the gateway device 302a if communicating with other gateway devices, such as the gateway device 302b. That is, the user may configure one or more rules identifying other gateway devices that the gateway device 302a is authorized to communicate with. The user may configure one or rules identifying authorization information that is to be provided by the gateway devices prior to exchanging data.

The user may further configure, via the gateway module, one or more rules identifying a level or type of encryption that is to be utilized by the gateway device 302a if exchanging data with other gateway devices and/or if transmitting data to a user device and/or from a user device. For example, the user may configure a first configuration setting associated with outgoing communications between the gateway device 302a and the user device 304a. The first configuration setting may be a first type of encryption that is to be applied by the gateway device 302a to data that is transmitted from the user device 304a to another computing device via the gateway device 302a. That is, data sent from the user device 304a to another computing device may be transmitted via the gateway device 302a. The gateway device 302a may receive, from the user device 304a, a request to transmit data from the user device 304a to another computing device. The request may comprise the data to be sent to the computing device. The gateway device 302a may then determine, based on the first configuration setting associated with outgoing data from the user device 304a, that the first type of encryption is to be applied to the outgoing data from the user device 304a. The gateway device 302a may then apply the first type of encryption to the data. The gateway device 302a may then forward the encrypted data to the computing device.

Additionally, or alternatively, the user may configure a second configuration setting associated with incoming communications between the gateway device 302a and the user device 304a. The second configuration setting may be a second type of encryption that is to be applied by the gateway device 302a to data that is transmitted to the user device 304a from another computing device via the gateway device 302a. That is, data sent to the user device 304a from another computing device may be transmitted via the gateway device 302a. The gateway device 302a may receive the incoming data from the computing device. The gateway device 302a may determine that the incoming data is to be sent to the user device 304a. The gateway device 302a may then determine, based on the second configuration setting associated with incoming data for the user device 304a, that the second type of encryption is to be applied to the incoming data for the user device 304a. The gateway device 302a may then apply the second type of encryption to the data. The gateway device 302a may then forward the encrypted data to the user device 304a. The first encryption type may be the same as or different than the second encryption type.

Additionally, or alternatively, the user may configure a third configuration setting associated with outgoing communications between the gateway device 302a and the user device 304b. The third configuration setting may be a third type of encryption that is to be applied by the gateway device 302a to data that is transmitted from the user device 304b to another computing device via the gateway device 302a. That is, data sent from the user device 304b to another computing device may be transmitted via the gateway device 302a. The gateway device 302a may receive, from the user device 304b, a request to transmit data from the user device 304b to another computing device. The request may comprise the data to be sent to the computing device. The gateway device 302a may then determine, based on the third configuration setting associated with outgoing data from the user device 304b, that the third type of encryption is to be applied to the outgoing data from the user device 304b. The gateway device 302a may then apply the third type of encryption to the data. The gateway device 302a may then forward the encrypted data to the computing device. The third type of encryption may be different than or the same as the first type of encryption and/or the second type of encryption.

Additionally, or alternatively, the user may configure a fourth configuration setting associated with incoming communications between the gateway device 302a and the user device 304b. The fourth configuration setting may be a fourth type of encryption that is to be applied by the gateway device 302a to data that is transmitted to the user device 304b from another computing device via the gateway device 302a. That is, data sent to the user device 304b from another computing device may be transmitted via the gateway device 302a. The gateway device 302a may receive the incoming data from the computing device. The gateway device 302a may determine that the incoming data is to be sent to the user device 304b. The gateway device 302a may then determine, based on the fourth configuration setting associated with incoming data for the user device 304b, that the fourth type of encryption is to be applied to the incoming data for the user device 304b. The gateway device 302a may then apply the fourth type of encryption to the data. The gateway device 302a may then forward the encrypted data to the user device 304b. The fourth encryption type may be the same as or different than the first encryption type, the second encryption type, and/or the third encryption type.

If these rules are configured by the user via the device portal management system 301, the device portal management system 301 may transmit the configured rules to the user device 304a and/or the user device 304b via the gateway device 302a. The device portal management system 301 may further transmit the configuration information for the gateway device 302a (as set by the user via the gateway module) to the gateway device 302a. Prior to transmitting the rules to the gateway device 302a, the device portal management system 301 may authenticate itself to the gateway device 302a via a username and password. The rules as configured by the user via the data fields 609a and 609b may be utilized to configure the gateway device 302a, the user device 304a, and/or the user device 304a. For example, the gateway device 302a may update the device modules for the user device 304a and the user device 304b based on the rules received for each device from the device portal management system 301.

Figure 7:
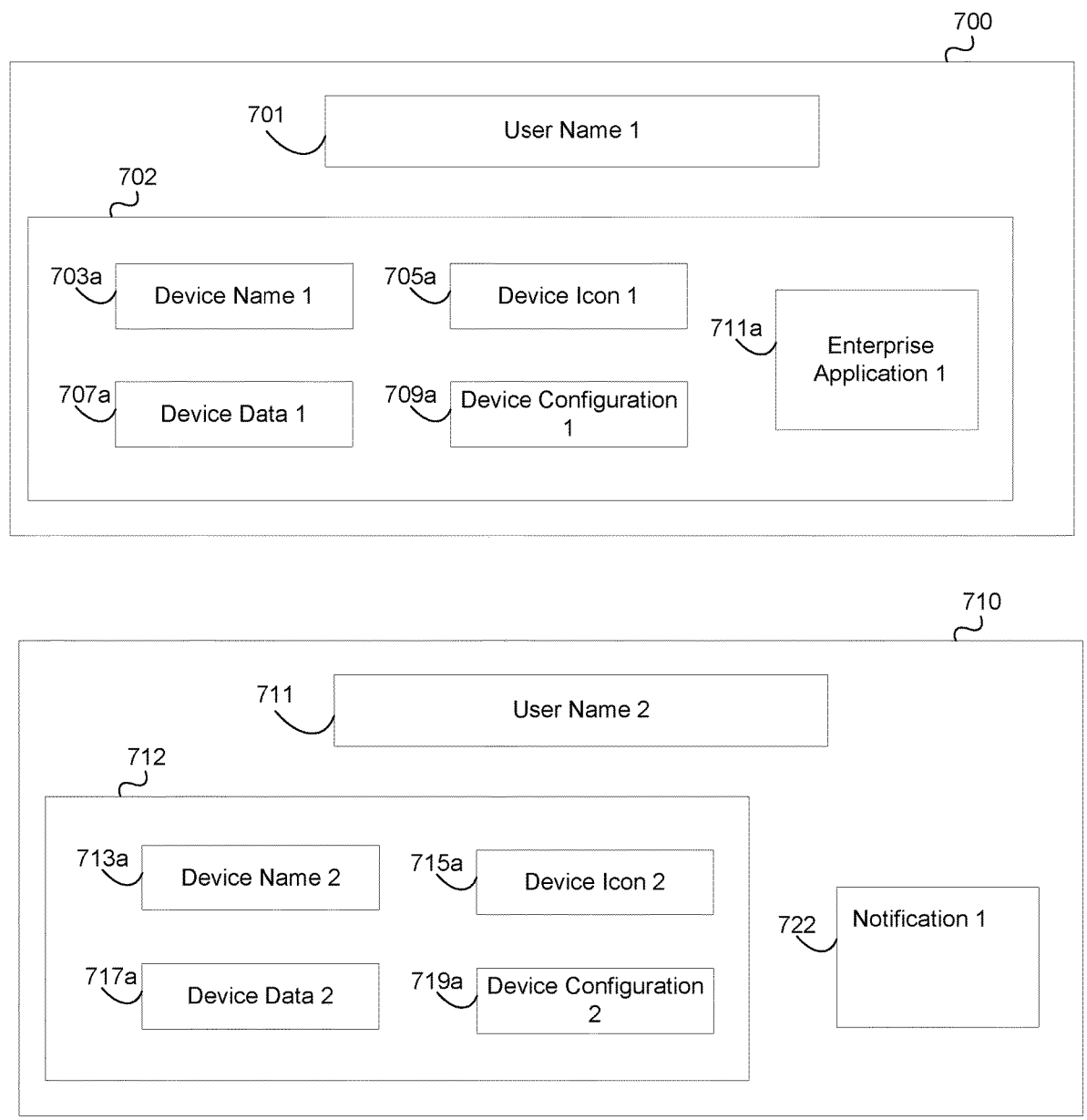
FIG. 7 shows two user interfaces that may be presented to two users of a device portal management system according to one or more illustrative aspects of the disclosure.

FIG. 7 shows two user interfaces that may be presented to two different users of an enterprise by the device portal management system 301. User interface 700 may be presented to a first user associated with a first premises. The user interface 710 may be presented to a second user associated with a second premises. The first premises may be associated with a first gateway device, such as the gateway device 302a. The second premises may be associated with a second gateway device, such as the gateway device 302b. The gateway device 302a may have discovered a first user device at the first premises, such as the user device 304a, and transmitted discovery data for the user device 304a to the device portal management system 301. The gateway device 302a may have subsequently transmitted additional data related to the user device 304a to the device portal management system 301, such as data related to various services offered by the user device 304a. The gateway device 302b may have discovered a second user device at the second premises, such as the user device 304c, and transmitted discovery data for the user device 304c to the device portal management system 301. The gateway device 302b may have subsequently transmitted additional data related to the user device 304c to the device portal management system 301, such as data related to services offered by the user device 304c.

User interface 700 may be displayed to the first user upon a successful login by the first user at the device portal management system 301. The data field 701 may display information related to the first user, such as the first user's name, information related to the first user's account with the enterprise, and/or any other desired information. The data field 703a may display a device name associated with the user device 304a and the data field 705a may display a device icon associated with the user device 304a. Data field 707a may display device data for the user device 304a, such as make and model of the user device 304a, as well as a link to applications and data stored on the user device 304a. The data field 709a may display rules that have been configured for the user device 304a by the first user.

In a first example, the first user may wish to share first data with the second user, or a specific user device associated with the second user. The first user may configure, via the data field 709a, the first data to be shared with the second user or the specific user device associated with the second user. The first user may configure security settings to be used by the second user to authorize access the first data (such as a username and/or password). The first user may further configure security settings for the first data, such as the type of encryption to be used on the first data if it is transmitted to the second user or to the specific user device associated with the second user, such as the user device 304c. The first user may further configure a time interval for which the first data is to be accessible by the second user and/or the user device 304c. Data field 707a may indicate that the first data is accessible to the user device 304c and/or the second user for the time interval selected by the first user.

The user interface 710 may be displayed to the second user upon a successful login by the second user at the device portal management system 301. The data field 711 may display information related with the second user, such as the second user's name, information related to the second user's account with the enterprise, and/or any other desired information. Data field 713a may display a device name associated with the user device 304c and the data field 722a may display a device icon associated with the user device 304c. Data field 717a may display device data for the user device 304c, such as make and model of the user device 304c, as well as a link to applications and data stored on the user device 304c. The data field 719a may display rules that have been configured for the user device 304c by the second user. The data field 722 may include a notification for the second user. The notification may indicate that the first user has shared the first data with the second user. The notification may include the time interval for which the first data will be available to the second user. The notification may further include a username and/or password to be utilized by the second user if accessing the first data. The data field 722 may be automatically generated and populated by the device portal management system 301 upon the first user sharing the first data with the second user. The device portal management system 301 may automatically display the data field 722 to the second user upon the second user logging onto the device portal management system 301.

As discussed above in reference to FIG. 6, the device portal management system 301 may be maintained by an organization or enterprise that offers various products and services that are associated with the premises' of its users. As further discussed above in reference to FIG. 6, a device module for each user device for which discovery data has been received from the gateway device associated with the premises of the user may be displayed within the user interface. While performing device discovery for a user device, such as the user device 304a, the gateway device, such as the gateway device 302a, may determine the functionalities of the user device 304a. In one instance, the gateway device 302a may determine if the user device 304a has the functionalities necessary to execute a enterprise application provided by the enterprise. If the gateway device 302a determines that the user device 304a has the functionality necessary to execute the enterprise application provided by the enterprise, the gateway device 302a may transmit a notification indicating this functionality to the device portal management system 301 if transmitting discovery data for the user device 304a to the device portal management system 301. In turn, if the device portal management system 301 displays a device module for the user device 304a, such as device module 710, to a user, such as the first user, device module 710 may include the data field 711a. The data field 711a may include the name of the enterprise application provided by the enterprise, or an icon representing the enterprise application.

If the first user selects the data field 711a, a configuration window for the enterprise application (not shown) may appear in user interface 720. The enterprise application may allow the enterprise to store data on user devices associated with the first user, such as the user device 304a and the user device 304b. The first user may configure, via the configuration window for the enterprise application, which user devices associated with the first user the enterprise application may store data on. For example, the first user may allow the enterprise application to store data on the user device 304a, but may not allow the enterprise application to store data on the user device 304b. The first user may further configure the amount of storage of each user device that is to be allocated to the enterprise application. For example, the first user may allow the enterprise application to store data on both the user device 304a and the user device 304b, but may allocate different storage amounts of the user device 304a and the user device 304b to the enterprise application.

The first user may further configure, via the configuration window, the time interval for which the enterprise may store data on each user device. For example, the first user may allow the enterprise application to store data on both the user device 304a and the user device 304b, but may allow the enterprise application to store data on the user device 304a for six months and may allow the enterprise application to store data on the user device 304b for one year. The first user may further configure, via the configuration window, the type of data that may be stored on each user device. The enterprise may offer the first user various incentives in exchange for the first user granting the enterprise application permission to store data on user devices associated with the first user. For example, the data to be stored on the user device 304a may be various audio and video files. The first user may be granted access to the audio and video files in exchange for allowing these files to be stored on the user device 304a. Alternatively, or additionally, the enterprise may offer the first user reduced prices for the services and products that the enterprise is currently providing to the first user.

Additionally, or alternatively, the enterprise application may allow the user to store data on one or more computing devices maintained by the enterprise on a cloud network or to retrieve data from one or more computing devices maintained by the enterprise on the cloud network. The user may access the cloud network via user devices associated with the first user, such as the user device 304a and the user device 304b. The first user may configure, via the configuration window for the enterprise application, the data that is to be stored on (or retrieved from) the one or more computing devices maintained by the enterprise on the cloud network. The first user may further configure, via the configuration window for the enterprise application, authorization information that is to be utilized to access the stored data. The first user may further configure, via the configuration window for the enterprise application, information identifying other users that are to be permitted to access the stored data. The first user may further configure, via the configuration window for the enterprise application, a level or type of encryption that is to be used on the stored data.

If the first user has completed configuration of the enterprise application relative to one or more user devices, the device portal management system 301 may store the configuration information for the enterprise application locally. The device portal management system 301 may further transmit the configuration information the enterprise application to the gateway device 302a. The device portal management system 301 may further transmit the information to one or more computing devices associated with the enterprise organization, such as the servers at local office 103. For example, the device portal management system 301 may transmit, to the local office 103, an identification of the first user, information identifying the user device 304a and/or the user device 304b, and the configuration rules as set by the first user for the enterprise application via the configuration window for the enterprise application.

Figure 8:
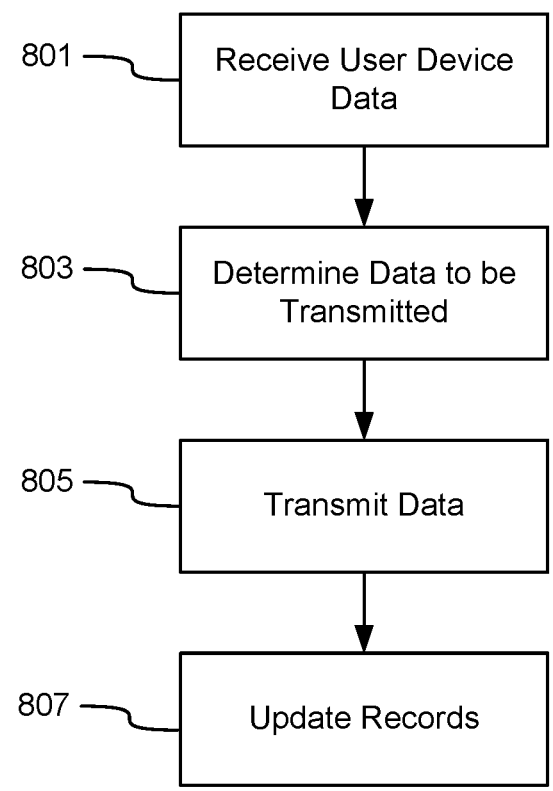
FIG. 8 shows an example method for sending data to a user device based on a user's selected configuration for the user device within an enterprise application according to one or more illustrative aspects of the disclosure.

FIG. 8 depicts an exemplary method for sending data to a user device based on a user's selected configuration for the user device for an enterprise application. At step 801, a server at local office 103, such as data server 106, may receive user-selected configuration information for a user device, such as the user device 304a. The configuration information may have been selected by a first user for an enterprise application within the device portal management system 301 for one or more user devices associated with the first user. The first user may have an account with the enterprise.

Data server 106 may be one or more computing devices that are configured to provide data, such as video on demand movies, television programs, songs, text listings, etc., to users in the homes. The information received by data server 106 at step 801 may include, for example, an identification of the first user, information identifying the user devices associated with the first user, and the configuration rules as set by the first user via the configuration window for the enterprise application within the device portal management system 301 for each user device.

At step 803, data server 106 may select the data that is to be stored at the user devices associated with the first user, such as the user device 304a and/or the user device 304b. Using the identification information of the first user, data server 106 may determine the geographical location of the user devices associated with the first user. Data server 106 may then determine one or more audio and/or video programs that are likely to be popular in the geographical location of the user devices (for example, if the user device is in the state of New York, programs set in New York and historical programs about the state of New York may be popular). Data server 106 may further determine the demographic population of the geographical location of the user devices and use this information to determine the video and/or audio files that are likely to be popular. Data server 106 may further query an application server at local office 103 (i.e. an application server that is responsible for monitoring user viewing habits and collecting that information) for information indicative of the programs that are currently popular in the geographical region of the user devices of the first user. Data server 106 may generate a set of popular programs in the geographical region of the first user using any one or more of these methods.

Data server 106 may then filter the set of popular programs to generate a filtered set of programs that is to be stored on user devices associated with the first user. Data server 106 may filter the set of popular programs based on the configuration rules set by the first user. For example, the first user may have specified that only programs of a first parental rating may be stored on the user device 304a, but may not have specified any such rule for the user device 304b. Data server 106 may then determine which of the popular programs fall within the first parental rating, and determine that only these filtered programs are to be stored on the user device 304a.

Data server 106 may alternatively or additionally filter the set of popular programs by determining which of the popular programs are already stored at other user devices in the geographical location of the first user. For example, if a first program of the set of popular programs is already stored on a predetermined number of user devices within the geographical region, data server 106 may determine that the first program does not need to be stored on user devices associated with the first user. On the other hand, data server 106 may determine that a second program of the set of popular programs is stored on less than a predetermined number of user devices in the geographical region, and that the second program should be stored on one or more user devices associated with the first user.

At step 805, the filtered set of programs may be transmitted to one or more user devices associated with the first user. Data server 106 may determine, for each program in the filtered set of programs, if that program is stored at a user device that is nearby to the user devices associated with the first user. For example, data server 106 may determine that a first program to be transmitted to the user device 304a (associated with the first user) is already stored at a first local user device nearby to the first user, and that a second program to be transmitted to the user device 304b (associated with the first user) is stored at a second local user device nearby to the first user. The first local user device may be associated with a second user at a second premises, and the second local user device may be associated with a third user at a third premises. The data server 106 may then transmit a first signal to the first local user device instructing the first local user device to transmit the first program to the user device 304a. The data server 106 may transmit the first signal to the first local user device via a gateway at the second premise. The data server 106 may then transmit a second signal to the second local user device instructing the second user device to transmit the second program to the user device 304b. The data server 106 may transmit the second signal to the second local user device via a gateway at the third premises. Data server 106 may further transmit a third signal to the gateway device 302a indicating that a first program to be stored on the user device 304a will be transmitted from the first local user device. The third signal may include information identifying the first local user device, as well as information identifying the first program. Data server 106 may further transmit a fourth signal to the gateway device 302a indicating that a second program to be stored on the user device 304b will be transmitted from the second local user device. The fourth signal may include information identifying the second local user device, as well as information identifying the second program. Alternatively, or additionally, data server 106 may send only one signal to the gateway device 302b identifying the first program the first local user device, the second program, and the second local user device.

Data server 106 may further determine that a third program in the filtered set of programs to be stored on the user device 304a is not currently stored on any other user devices local to the first user. Accordingly, data server 106 may transmit the third program to the user device 304a via link 101 and the gateway device 302a. Prior to transmitting the third program, data server 106 may transmit a signal to the gateway device 302a identifying the third program and indicating that the third program is to be stored on the user device 304a. Alternatively, or additionally, this information can be included in the transmittal of the third program to the user device 304a via the gateway device 302a.

At step 807, data server 106 may update local records to indicate that the programs in the filtered set of programs are being stored on one or more user devices associated with the first user. For example, a data module may be created within data server 106, or within another server or databased maintained by the enterprise. The data module may store information about the first user, such as name, address, etc. The data module may further store information about the first user's account with the enterprise. The data module may further store information about each user device associated with the first user that is currently being used by the enterprise application (i.e. each user device associated with the first user on which the enterprise is currently storing program data). For example, the data module may indicate, for each user device associated with the first user, a geographical location of the user device (i.e. the address of the first user). The data module may further include a list of programs being stored on that user device. The data module may further include the configuration rules selected by the first user for each user device (for example, the allowable parental ratings for the programs to be stored on the user devices).

Figure 9:
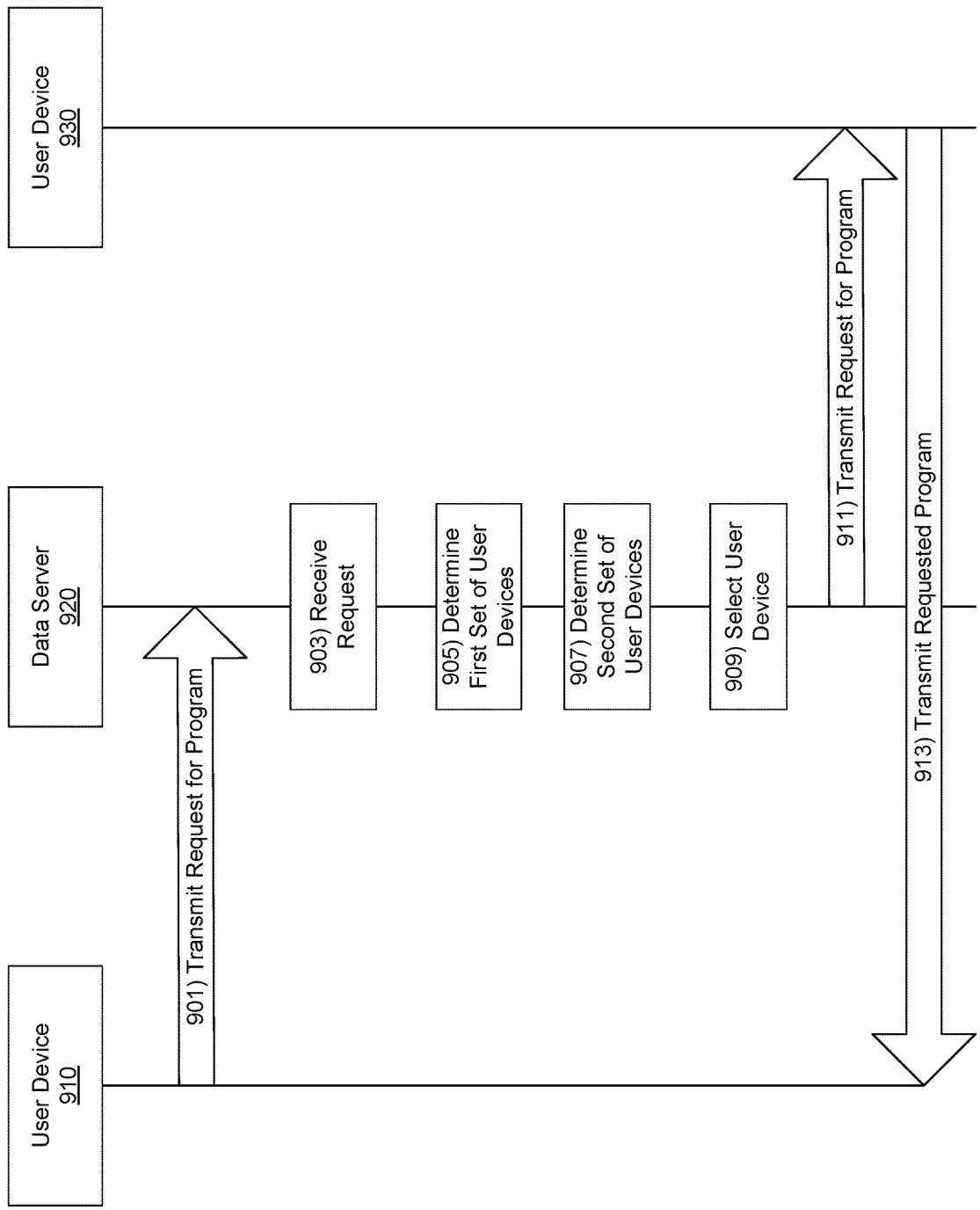
FIG. 9 shows an example method for transmitting program data to a user device using data received from an enterprise application according to one or more illustrative aspects of the disclosure.

FIG. 9 depicts an exemplary method for transmitting program data to a user device using data received from an enterprise application. At step 901, user device 910 may send a request for a program to data server 920. User device 910 may be associated with a first user premises associated with a first user of the enterprise. User device 910 may be any of the user devices discussed above in reference to FIG. 3, such as the user device 304a, and may include one or more of televisions, set top boxes (STBs), personal computers, laptop computers, wireless devices such as wireless laptops and netbooks, mobile phones, mobile televisions, personal digital assistants (PDA), tablets, smartwatches, etc.), and any other desired devices. The request for data may be a request for a video file and/or an audio file.

At step 903, data server 920 may receive the request for the program from user device 910. Data server 920 may be associated with local office 103, and may be data server 106. As discussed above in reference to FIG. 1, there may be one link 101 originating from the local office 103, and it may be split a number of times to distribute a signal to various locations 102 (i.e. user premises) in the vicinity (which may be many miles) of the local office 103. A signal may be sent from local office 103 to a user premises using link 101 in response to a request for data from a user device at the user premises. If the local office 103 receives numerous simultaneous requests from data from different user devices associated with different user premises, the bandwidth of link 101 may not be able to support the numerous response signals that may be sent back to these user devices, as the response signals may each include different (and large) audio and/or video files. Accordingly, it may be advantageous for a server at local office 103, such as data server 920, to determine if each of the user requests can be completed locally. In other words, it may be advantageous for a server at local office 103 to determine if a request for a program received from a first user device can be completed by a second user device that is local to first user device (instead of via link 101).

At step 905, data server 920 may analyze the request for the program received from user device 910 to determine if the request for program may be completed locally. Data server 920 may first determine the location of user device 910. This data may be stored in a server at the local office 103. As noted above, user device 910 may be associated with a first user premises associated with a first user. As discussed above with reference to FIG. 1, data server 106 may include software to validate user identities and entitlements. Data server 920 may use this information to determine the premises associated with user device 910. Alternatively, or additionally, user device 910 may include its current location in the request for data sent to data server 920, or data server 920 may request the location data from user device 910 (not shown) in response to receiving the request for data.

If data server 920 determines the location of user device 910, data server 920 may determine a plurality of nearby user devices that are currently storing data for the enterprise via the enterprise application. The plurality of nearby user devices may include a plurality of user devices that are located within a threshold distance of user device 910. As discussed above in reference to FIG. 8, data server 106 may maintain internal records that include the geographical location of each user device that is currently storing data for the enterprise via the enterprise application. Using these internal records, data server 920 may determine a first plurality of user devices that includes a list of user devices that are within a threshold distance of user device 910.

At step 907, the data server 920 may then filter the first plurality of user devices to determine which user devices from the first set are storing the program that was indicated in the request received at step 901. As discussed above in reference to FIG. 8, data server 106 may maintain internal records that include a list of programs that is currently stored on each user device that is currently storing data for the enterprise via the enterprise application. Using these internal records, data server 920 may determine a second plurality of user devices that includes a list of user devices that are both within a threshold distance of user device 910 and that currently store the program included in the request received at step 901.

At step 909, the data server 920 may select a user device 930 from the second plurality of user devices. The data server 920 may select the user device 930 using one or more predetermined criteria. For example, the data server 920 may select a user device 930 with the fastest transmittal capability. In another example, the data server 920 may select a user device 930 that is not currently in use by the enterprise application (i.e. a user device that is not already sending a program to another user device). The one or more predetermined criteria may be dynamically configured. If the data server 920 determines that no user device within a threshold distance of user device 910 currently stores the program from the request received at step 901, data server 920 may transmit the program to user device 910 via link 101 (not shown).

At step 911, the data server 920 may send a signal to user device 930 via a gateway device associated with the user device 930. The signal may include an identification of the user device 930, an identification of the program received in the request at step 901, an identification of the user device 910 (i.e. the user device to which the program is to be transmitted), and an identification of a gateway device associated with the user device 910. At step 913, the user device 930 may transmit the program to user device 910. User device 930 may first transmit the program to the gateway device associated with the user device 930. The gateway device associated with the user device 930 may then transmit the program to a gateway device associated with user device 910. The gateway device associated with user device 910 may then transmit the program to user device 910.

Although example embodiments are described above, the various features and steps may be combined, divided, omitted, rearranged, revised or augmented in any desired manner, depending on the specific outcome or application. Various alterations, modifications, and improvements will readily occur to those skilled in art. Such alterations, modifications, and improvements as are made obvious by this disclosure are intended to be part of this description, though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   receiving, by a server and from a plurality of computing devices, information comprising:
     identification information indicating a plurality of user devices associated with the plurality of computing devices; and
     content information indicating content stored on the plurality of user devices;
   causing, based on receiving authentication information associated with a computing device of the plurality of computing devices, output of an interface comprising an option to input user-specified sharing rules for at least one user device of the plurality of user devices associated with the computing device;
   receiving, by the server, a plurality of user-specified sharing rules associated with the at least one user device of the plurality of user devices, wherein the plurality of user-specified sharing rules comprises first user-specified sharing rules associated with the at least one user device and received via the interface; and
   sending, to the computing device of the plurality of computing devices, instructions to cause the at least one user device of the plurality of user devices to share content according to the plurality of user-specified sharing rules.

2. The method of claim 1, wherein the plurality of computing devices comprise a plurality of gateway devices associated with a plurality of premises, and
   wherein the plurality of user devices comprises two or more of a television, a set-top box, a desktop computer, a laptop computer, a mobile phone, a tablet, or a smartwatch.

3. The method of claim 1, further comprising:
   receiving different firewall settings for at least two user devices of the plurality of user devices; and
   sending, to at least one of the plurality of computing devices, instructions to set up firewalls for the at least two user devices according to the different firewall settings.

4. The method of claim 1, wherein the content comprises content stored on the at least one user device of the plurality of user devices, and wherein the plurality of user-specified sharing rules comprises at least one sharing setting that indicates a schedule for backing up the content, stored on the at least one user device, on the second user device of the plurality of user devices.

5. The method of claim 1, wherein receiving the plurality of user-specified sharing rules further comprises receiving a plurality of device-specific encryption rules for each user device of the plurality of user devices.

6. The method of claim 1, wherein the sending instructions further comprises:
   sending information indicating a location, associated with a second user device of the plurality of user devices, to store the content.

7. The method of claim 1, wherein the first user-specified sharing rules are configured to cause the at least one user device to store information indicating that a second user device of the plurality of user devices accessed the content.

8. The method of claim 1, wherein the computing device is a gateway device for a premises, the plurality of user devices comprises a plurality of wireless devices connected via the computing device to a local network of the premises, and the server is remote to the premises.

9. A server comprising:
   one or more first processors; and
   memory storing first instructions that, when executed by the one or more first processors, cause server to:
     receive, from a plurality of computing devices, information comprising:
       identification information indicating a plurality of user devices associated with the plurality of computing devices; and content information indicating content stored on the plurality of user devices;

cause, based on receiving authentication information associated with a computing device of the plurality of computing devices, output of an interface comprising an option to input user-specified sharing rules for at least one user device of the plurality of user devices associated with the computing device;

receive a plurality of user-specified sharing rules associated with the at least one user device of the plurality of user devices, wherein the plurality of user-specified sharing rules comprises first user-specified sharing rules associated with the at least one user device and received via the interface; and send, to the computing device, instructions to cause the at least one user device of the plurality of user devices to share content according to the plurality of user-specified sharing rules.

10. The server of claim 9, wherein the plurality of computing devices comprises a plurality of gateway devices associated with a plurality of premises, and wherein the plurality of user devices comprises two or more of a television, a set-top box, a desktop computer, a laptop computer, a mobile phone, a tablet, or a smartwatch.

11. The server of claim 9, when executed by the one or more first processors, further cause the server to:

receive different firewall settings for at least two user devices of the plurality of user devices; and send, to at least one of the plurality of computing devices, instructions to set up firewalls for the at least two user devices according to the different firewall settings.

12. The server of claim 9, wherein the content comprises content stored on the at least one user device, and wherein the plurality of user-specified sharing rules further comprises second user-specified sharing rules that indicates a schedule for backing up the content stored on the at least one user device on a second user device of the plurality of user devices.

13. The server of claim 9, wherein receiving the plurality of user-specified sharing rules further comprises receiving a plurality of device-specific encryption rules for each user device of the plurality of user devices.

14. The server of claim 9, wherein the sending instructions to cause the at least one user device of the plurality of user devices to share content further comprises:

send, to the computing device, instructions to cause the at least one user device, based on the plurality of user-specified sharing rules, to send information to a second user device of the plurality of user devices indicating a location in a storage associated with the second user device to store the content.

15. The server of claim 9, wherein the first user-specified sharing rules are configured to cause the at least one user device to store information indicating that a second user device of the plurality of user devices accessed the content.

16. The server of claim 9, wherein the computing device is a gateway device for a premises, the plurality of user devices comprises a plurality of wireless devices connected via the computing device to a local network of the premises, and the server is remote to the premises.

17. A non-transitory computer readable medium storing instructions that, when executed, cause:

receiving, by a server and from a plurality of computing devices, information comprising:

identification information indicating a plurality of user devices associated with the plurality of computing devices; and content information indicating content stored on the plurality of user devices;

causing, based on receiving authentication information associated with a computing device of the plurality of computing devices, output of an interface comprising an option to input user-specified sharing rules for at least one user device of the plurality of user devices associated with the computing device;

receiving, by the server via the interface, a plurality of user-specified sharing rules associated with the at least one user device of the plurality of user devices, wherein the plurality of user-specified sharing rules comprises first user-specified sharing rules associated with the at least one user device and received via the interface; and sending, to the computing device, instructions to cause the at least one user device of the plurality of user devices to share content according to the plurality of user-specified sharing rules.

18. The non-transitory computer readable medium of claim 17, wherein the plurality of computing devices comprises a plurality of gateway devices associated with a plurality of premises, and wherein the plurality of user devices comprises two or more of a television, a set-top box, a desktop computer, a laptop computer, a mobile phone, a tablet, or a smartwatch.

19. The non-transitory computer readable medium of claim 17, wherein the instructions, when executed, further cause:

receiving different firewall settings for at least two user devices of the plurality of user devices; and sending, to at least one of the plurality of computing devices, instructions to set up firewalls for the at least two user devices according to the different firewall settings.

20. The non-transitory computer readable medium of claim 17, wherein the content comprises content stored on the at least one user device of the plurality of user devices, and wherein the plurality of user-specified sharing rules further comprises second user-specified sharing rules that indicates a schedule for backing up the content stored on the at least one user device on a second user device of the plurality of user devices.

21. The non-transitory computer readable medium of claim 17, wherein receiving the plurality of user-specified sharing rules further comprises receiving a plurality of device-specific encryption rules for each user device of the plurality of user devices.

22. The non-transitory computer readable medium of claim 17, wherein the instructions, when executed, further cause:

sending, to the computing device, instructions to cause the at least one user device, based on the plurality of user-specified sharing rules, to send information to a second user device of the plurality of user devices, indicating a location, in a storage associated with the second user device, to store the content.

23. The non-transitory computer readable medium of claim 17, wherein the first user-specified sharing rules are configured to cause the at least one user device to store information indicating that a second user device of the plurality of user devices accessed the content.

24. The non-transitory computer readable medium of claim 17, wherein the computing device is a gateway device for a premises, the plurality of user devices comprises a plurality of wireless devices connected via the computing device to a local network of the premises, and the server is remote to the premises.

\* \* \* \* \*